(12) United States Patent
Lee et al.

(10) Patent No.: US 11,367,582 B2
(45) Date of Patent: Jun. 21, 2022

(54) KEYBOARD AND KEYSWITCH

(71) Applicant: DARFON ELECTRONICS CORP., Taoyuan (TW)

(72) Inventors: Che-Wei Lee, Taoyuan (TW); Chih-Ho Hsu, Taoyuan (TW); Zheng-Hong Lai, Taoyuan (TW)

(73) Assignee: DARFON ELECTRONICS CORP., Taoyuan (TW)

( * ) Notice: Subject to any disclaimer, the term of this patent is extended or adjusted under 35 U.S.C. 154(b) by 0 days.

(21) Appl. No.: 16/809,493

(22) Filed: Mar. 4, 2020

(65) Prior Publication Data

US 2021/0225604 A1   Jul. 22, 2021

(30) Foreign Application Priority Data

Jan. 20, 2020   (TW) .................................. 109101974

(51) Int. Cl.
*H01H 13/88*      (2006.01)
*H01H 13/785*    (2006.01)
*G06F 3/02*        (2006.01)
*G06F 1/16*        (2006.01)

(52) U.S. Cl.
CPC ............ *H01H 13/88* (2013.01); *G06F 1/1662* (2013.01); *G06F 3/0202* (2013.01); *H01H 13/785* (2013.01); *H01H 2203/0085* (2013.01)

(58) Field of Classification Search
CPC .................. H01H 13/88; H01H 13/785; H01H 2203/0085; H01H 13/70; H01H 13/7006; H01H 13/702; H01H 13/704; H01H 13/705; H01H 13/7065; H01H 3/125; G06F 3/0202; G06F 1/1662; G06F 3/02; G06F 1/16
See application file for complete search history.

(56) References Cited

U.S. PATENT DOCUMENTS

| | | | |
|---|---|---|---|
| 5,953,199 A | 9/1999 | Owens | |
| 6,639,162 B2 | 10/2003 | Sandbach | |
| 6,680,731 B2 | 1/2004 | Gerpheide | |
| 6,924,789 B2 | 8/2005 | Bick | |
| 7,102,614 B2 | 9/2006 | Sandbach | |
| 7,151,528 B2 | 12/2006 | Taylor | |

(Continued)

FOREIGN PATENT DOCUMENTS

| | | |
|---|---|---|
| CN | 204144117 U | 2/2015 |
| CN | 205893784 U | 1/2017 |

(Continued)

*Primary Examiner* — Lheiren Mae A Caroc
(74) *Attorney, Agent, or Firm* — Winston Hsu (57) ABSTRACT

A keyswitch includes a base, a keycap, a lift mechanism, a touch circuitry portion, and an outer covering layer. The keycap is connected to the base through the lift mechanism so as to move up and down relative to the base. The touch circuitry portion is disposed on the top surface of the keycap. A connection circuitry portion extends from the touch circuitry portion. The outer covering layer covers the touch circuitry portion and at least a portion of the connection circuitry portion. Thereby, the keyswitch can provide touch function without excessively increasing the whole thickness of the keyswitch. A keyboard includes a plurality of the keyswitches and therefore can provide touch function without excessively increasing the whole thickness of the keyboard.

32 Claims, 9 Drawing Sheets

(56) References Cited

U.S. PATENT DOCUMENTS

| | | |
|---|---|---|
| 9,443,672 B2 | 9/2016 | Martisauskas |
| 9,588,551 B1 | 3/2017 | Hegde |
| 9,710,069 B2 | 7/2017 | Leong |
| 10,056,205 B2 | 8/2018 | Hegde |
| 10,254,851 B2 | 4/2019 | Leong |
| 10,289,210 B1 * | 5/2019 | Wang ................ H01H 13/00 |
| 10,514,772 B1 * | 12/2019 | Wang ............. H03K 17/9622 |
| 2004/0196268 A1 | 10/2004 | Hsu |
| 2007/0091070 A1 | 4/2007 | C. Larsen |
| 2010/0148995 A1 | 6/2010 | Elias |
| 2010/0232861 A1 | 9/2010 | Shibata |
| 2012/0306752 A1 | 12/2012 | Hosoya |
| 2016/0049266 A1 * | 2/2016 | Stringer ............ H01H 13/83 |
| | | 200/344 |
| 2017/0069444 A1 * | 3/2017 | Wang ............... H01H 13/023 |
| 2018/0323021 A1 | 11/2018 | Lai |
| 2019/0196603 A1 | 6/2019 | Leong |

FOREIGN PATENT DOCUMENTS

| | | |
|---|---|---|
| EP | 3477438 A1 | 5/2019 |
| TW | 201513153 A | 4/2015 |
| TW | I604484 B | 11/2017 |
| TW | 201933401 A | 8/2019 |

* cited by examiner

KEYBOARD AND KEYSWITCH

BACKGROUND OF THE INVENTION

1. Field of the Invention

The present invention relates to a keyboard and a keyswitch, and more particularly to a keyboard and a keyswitch with touch function.

2. Description of the Prior Art

The widely used human-machine input devices are mainly keyboards and mice. Conventional notebook computers or tablet computers are usually equipped with a touch pad or a touch screen, so the mouse can be omitted. In principle, desktop computers or smart TVs still need a mouse. For this issue, keyboards with touch functions are available on the market to reduce the number of external devices. There is a keyboard on the market. A touch film is provided on a key area of the keyboard to provide both key and touch functions in the key area. The touch film can be disposed under the keycaps but needs to have a hole structure to avoid the keycap structure (such as a structure connecting with a support frame). The hole structure will reduce the stiffness of the touch film and increase the difficulty of assembling the touch film to the keycap. Furthermore, the hole structure also easily makes the touch function discontinuous. There is another similar keyboard on the market. Its keycap of the keyboard is a combined structure. Its film is sandwiched in the combined structure, which can avoid the hole structure but increases the overall thickness of the keycap and the complexity of assembly.

SUMMARY OF THE INVENTION

The present disclosure provides a keyboard, which has touch circuitry, disposed on top surfaces of keycaps thereof, and a protection layer over the touch circuitry, for providing sensitive touch sensing and reducing the degree of touch-sensing discontinuity of the touch circuitry.

A keyboard according to the present invention includes a base, a first keycap, a first lift mechanism, a first touch circuitry portion, a connection circuitry portion, a second keycap, a second lift mechanism, a second touch circuitry portion, and an outer covering layer. The first keycap is disposed above the base and has a first horizontal keycap surface. The first lift mechanism is disposed between the base and the first keycap. The first keycap is up and down movable relative to the base through the first lift mechanism. The first touch circuitry portion is disposed on the first horizontal keycap surface. The connection circuitry portion extends outward from the first touch circuitry portion. The second keycap is disposed above the base and has a second horizontal keycap surface. The second lift mechanism is disposed between the base and the second keycap. The second keycap is up and down movable relative to the base through the second lift mechanism. The second touch circuitry portion is disposed on the second horizontal keycap surface. The outer covering layer covers the first touch circuitry portion, the second touch circuitry portion, and at least one portion of the connection circuitry portion simultaneously. Thereby, it is unnecessary to form holes on the first touch circuitry portion and the second touch circuitry portion, which can reduce the touch-sensing discontinuity of the touch circuitry. The first touch circuitry portion and the second touch circuitry portion are disposed above the first keycap and the second keycap, so the structures of the first keycap and the second keycap will not interfere with the touch sensing in principle. The outer covering layer that covers the first touch circuitry portion and the second touch circuitry portion can provide protection thereto. Furthermore, in practice, the thickness of the outer covering layer is usually much smaller than the thickness of common structural parts (e.g. the thickness of the keycap in combined structure in the prior art), which can avoid an excessive increase in thickness due to the disposition of the touch circuitry.

Another objective of the invention is to provide a keyswitch, which has touch circuitry, disposed on the top surface of its keycap, and a protection layer over the touch circuitry, for providing sensitive touch sensing and reducing the degree of touch-sensing discontinuity of the touch circuitry.

A keyswitch according to the present invention includes a base, a keycap, a lift mechanism, a touch circuitry portion, a connection circuitry portion, and an outer covering layer. The keycap is disposed above the base and has a horizontal keycap surface. The lift mechanism is disposed between the base and the keycap. The keycap is up and down movable relative to the base through the lift mechanism. The touch circuitry portion is disposed on the horizontal keycap surface. The connection circuitry portion extends outward from the touch circuitry portion. The outer covering layer covers the touch circuitry portion and horizontally protrudes out of the keycap. The outer covering layer is flexible. Thereby, it is unnecessary to form holes on the touch circuitry portion, which can reduce the touch-sensing discontinuity of the touch circuitry. The touch circuitry portion is disposed above the keycap, so the structure of the keycap will not interfere with the touch sensing in principle. The outer covering layer that covers the touch circuitry portion can provide protection thereto. Furthermore, in practice, the thickness of the outer covering layer is usually much smaller than the thickness of common structural parts (e.g. the thickness of the keycap in combined structure in the prior art), which can avoid an excessive increase in thickness due to the disposition of the touch circuitry.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
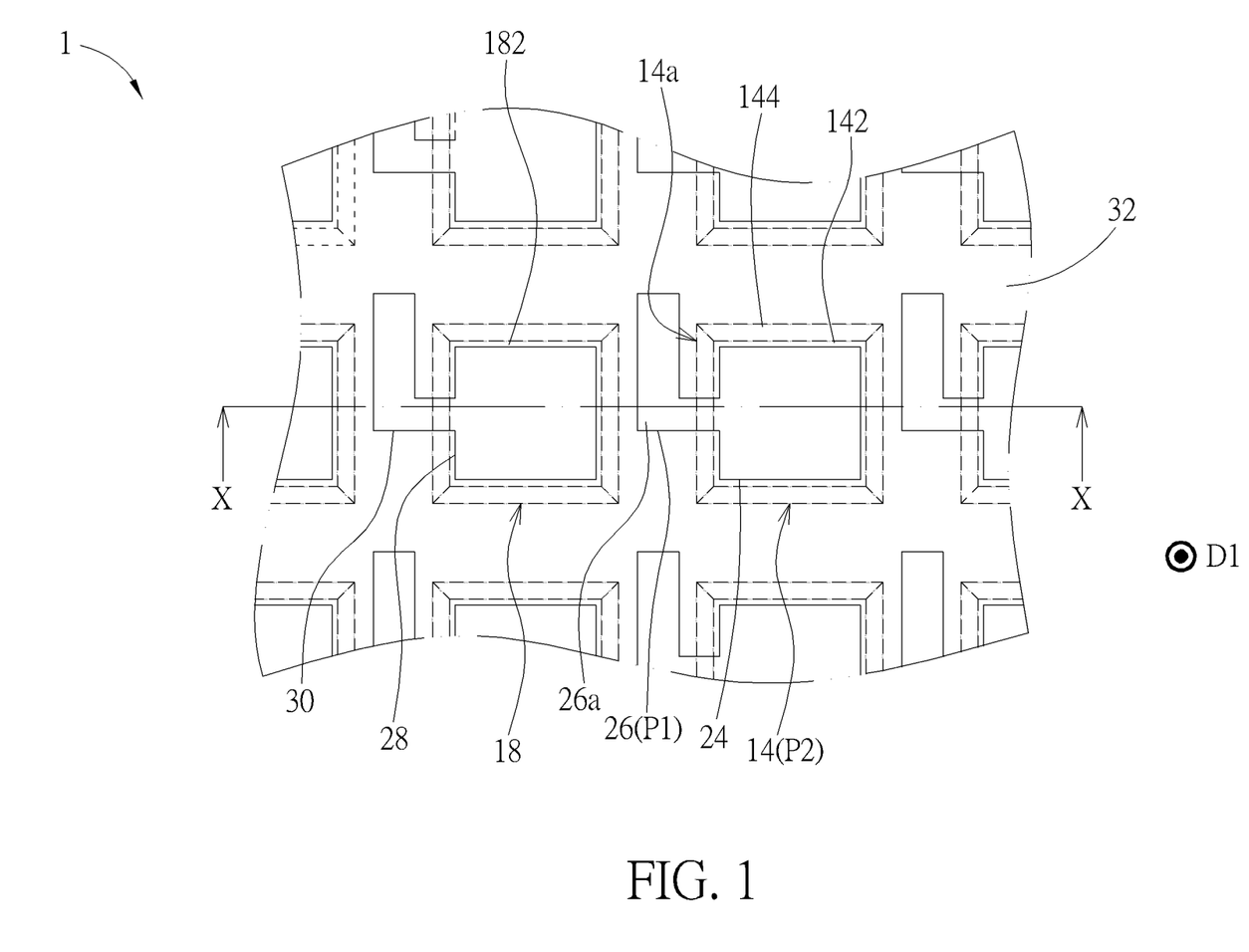
FIG. 1 is a top view of a portion of a keyboard according to an embodiment.
Figure 2:
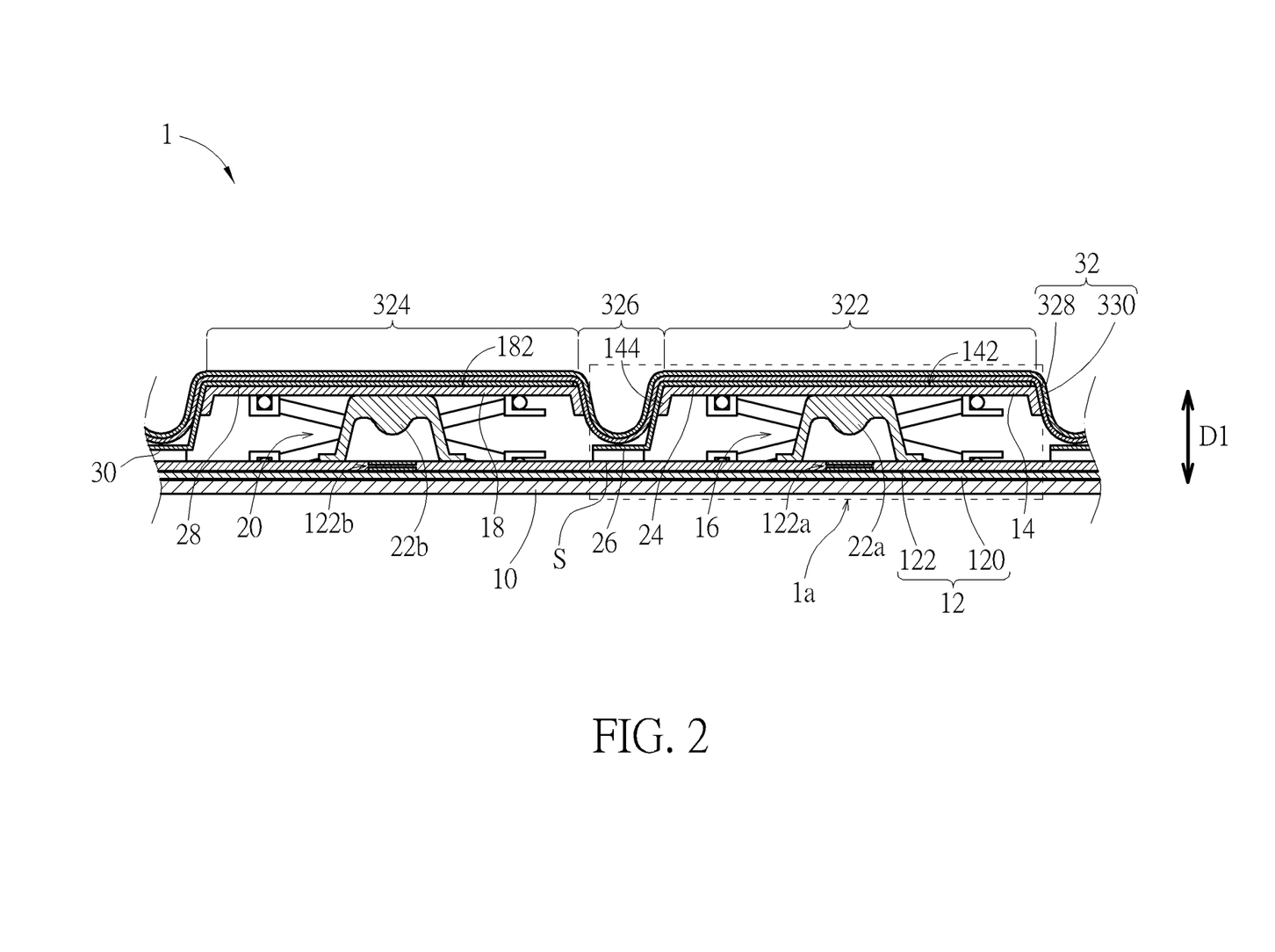
FIG. 2 is a sectional view of the keyboard along the line X-X in FIG. 1.

Please refer to FIG. 1 and FIG. 2. A keyboard 1 according to an embodiment includes an outer casing 10, a base 12, a first keycap 14, a first lift mechanism 16, a second keycap 18, and a second lift mechanism 20; therein, the profiles of the keycaps 14 and 18 are shown in hidden lines in FIG. 1. The first keycap 14 and the second keycap 18 are disposed above the base 12. The first lift mechanism 16 is disposed between the base 12 the first keycap 14. The first keycap 14 can move up and down relative to the base 12 through the first lift mechanism 16. The second lift mechanism 20 is disposed between the base 12 and the second keycap 18. The second keycap 18 can move up and down relative to the base 12 through the second lift mechanism 20. The base 12 includes a base plate 120 and a circuit board 122 (e.g. but not limited to a membrane circuit board, which is a sandwich structure and includes two substrates with circuitry layout thereon and an isolation layer therebetween). The circuit board 122 has two switches 122a and 122b corresponding to the first keycap 14 and the second keycap 18 respectively. The keyboard 1 also includes two elastic restoration parts 22a and 22b (e.g. but not limited to rubber dome) disposed between the first and second keycaps 14 and 18 and the two switches 122a and 122b respectively. When moving downward toward the base plate 122, the first keycap 14 can press the elastic restoration part 22a to trigger the switch 122a. When moving downward toward the base plate 122, the second keycap 18 can press the elastic restoration part 22b to trigger the switch 122b. Furthermore, in the embodiment, the first lift mechanism 16 and the second lift mechanism 20 are realized by a scissors support, respectively; however, it is not limited thereto in practice. For example, it can be realized by a butterfly support (constructed in V-shaped), cantilever structure, telescopic tube structure (i.e. formed by two tubular objects slidably stacked), or other mechanisms by which the keycaps 14 and 18 can move up and down relative to the base 12. For these cases, the elastic restoration parts 22a and 22b may need modification accordingly. For example, in a case of the butterfly support, the elastic restoration parts 22a and 22b can be realized by magnets accordingly. In logic, the keyboard 1 can be regarded as a combination of a plurality of keyswitches 1a (one of which is indicated by a dashed frame in FIG. 2).

In the embodiment, the keyboard 1 further includes a first touch circuitry portion 24, a first connection circuitry portion 26, a second touch circuitry portion 28, a second connection circuitry portion 30, and an outer covering layer 32. The profiles of circuitry portions 24, 26, 28 and 30 are shown in hidden lines in FIG. 1. The first keycap 14 has a first horizontal keycap surface 142. The first touch circuitry portion 24 is disposed on the first horizontal keycap surface 142. The first connection circuitry portion 26 extends outward from the first touch circuitry portion 24 to be connected to the circuit board 122. The second keycap 18 has a second horizontal keycap surface 182. The second touch circuitry portion 28 is disposed on the second horizontal keycap surface 182. The second connection circuitry portion 30 extends outward from the second touch circuitry portion 28 to be connected to the circuit board 122. The outer covering layer 32 covers the first touch circuitry portion 24, the first connection circuitry portion 26, the second touch circuitry portion 28, and the second connection circuitry portion 30 simultaneously, for providing protection. The keyboard 1 can provide users touch function (e.g. sensing movement of touch points, sensing clicking) through the first touch circuitry portion 24 and the second touch circuitry portion 28. The first touch circuitry portion 24 and the second touch circuitry portion 28 can be realized by existing resistive, capacitive, or optical touch technologies in practice, which will not be described in addition. Furthermore, in the embodiment, the first keycap 14 and the second keycap 18 are separate.

The outer covering layer 32 also covers the gap between the first keycap 14 and the second keycap 18. Such structural configuration can increase the protection effect (including dustproof and waterproof) on the keyboard 1. For single keyswitch, the outer covering layer 32 horizontally protrudes out of the first keycap 14 (or the second keycap 18).

In the embodiment, the outer covering layer 32 has a first portion 322, a second portion 324, and an extension portion 326 connecting the first portion 322 and the second 324. The first portion 322 covers the first touch circuitry portion 24. The second portion 324 covers the second touch circuitry portion 28. The extension portion 326 protrudes out of the first horizontal keycap surface 142 and the second horizontal keycap surface 182 and covers the first connection circuitry portion 26 and the gap between the first keycap 14 and the second keycap 18. The extension portion 326 is flexible (e.g. which can be achieved by its material or structural configuration), so that when a height difference between the first keycap 14 and the second keycap 18 in a vertical direction D1 (indicated by a double headed arrow in FIG. 2) is formed due to a pressing thereon, the first portion 322 and the second portion 324 will not be excessively pulled. Furthermore, in the embodiment, the extension portion 326 shows a curved structure bending toward the base 12 (e.g. substantially a U-shaped structure in the view point of FIG. 2), which facilitates the relative movement of the first keycap 14 and the second keycap 18 in the vertical direction D1 without excessively pulling each other. Furthermore, the outer covering layer 32 also includes an extension portion for each gap between the first and second keycaps 14 and 18 and other adjacent keycaps. The function of these extension portions is the same as the extension portion 326 and will not be described in addition.

In the embodiment, the first keycap 14 has a keycap skirt 144 bending and extending from the first horizontal keycap surface 142 slanting toward the base 12. In practice, the keycap skirt 144 is not limited to surround the first horizontal keycap surface 142. The first touch circuitry portion 24 is fixed onto the first horizontal keycap surface 142 (e.g. but not limited to by glue). The first portion 322 is fixed onto the first touch circuitry portion 24 (e.g. but not limited to by glue). The extension portion 326 completely covers the keycap skirt 144. In practice, when the first touch circuitry portion 24 incompletely covers the first horizontal keycap surface 142, the first portion 322 can be also fixed onto the first horizontal keycap surface 142.

Figure 3:
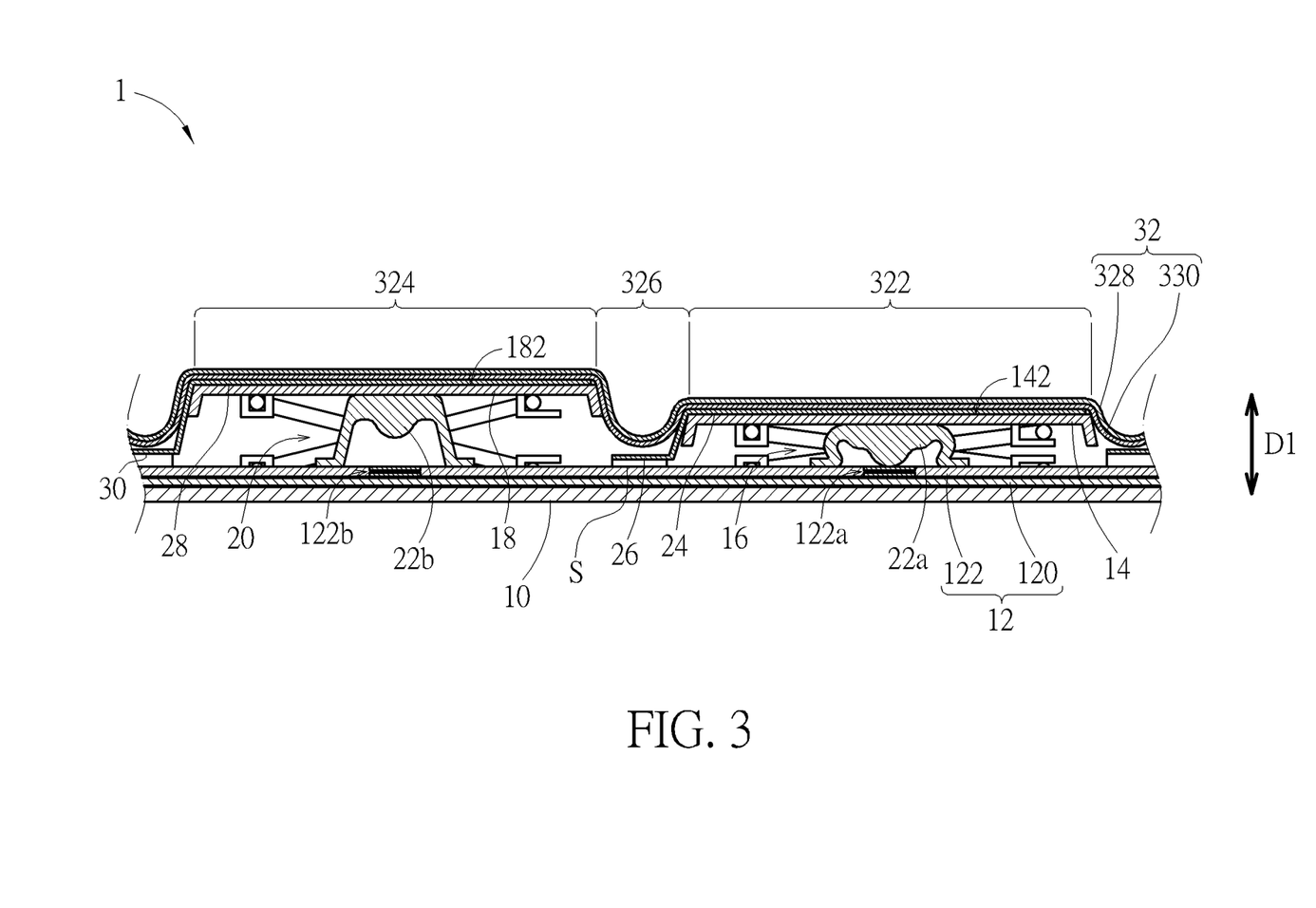
FIG. 3 is a sectional view of the keyboard when a first keycap thereof in FIG. 2 is pressed.

In the embodiment, the first touch circuitry portion 24 and the keycap skirt 144 can be separate, and the extension portion 326 and the keycap skirt 144 can be separate, so that when the first keycap 14 is pressed, the first touch circuitry portion 24 and the extension portion 326 can be at least partially separate from the keycap skirt 144, so as to prevent the first portion 322 and the second portion 324 from excessively pulling each other and also to prevent the first touch circuitry portion 24 and the first connection circuitry portion 26 from excessively pulling each other, as shown by FIG. 3. However, in practice, it is practicable to fix the first touch circuitry portion 24 to the keycap skirt 144. Furthermore, in the embodiment, the extension portion 326 is partially fixed to the first connection circuitry portion 26, but it is not limited thereto in practice. For example, the extension portion 326 is not directly fixed to the first connection circuitry portion 26, and is not directly fixed to the portion of the first touch circuitry portion 24 corresponding to the keycap skirt 144. In addition, the above descriptions also apply to the connection relationship between the second keycap 18, the second touch circuitry portion 28, and the extension portion 326.

Figure 4:
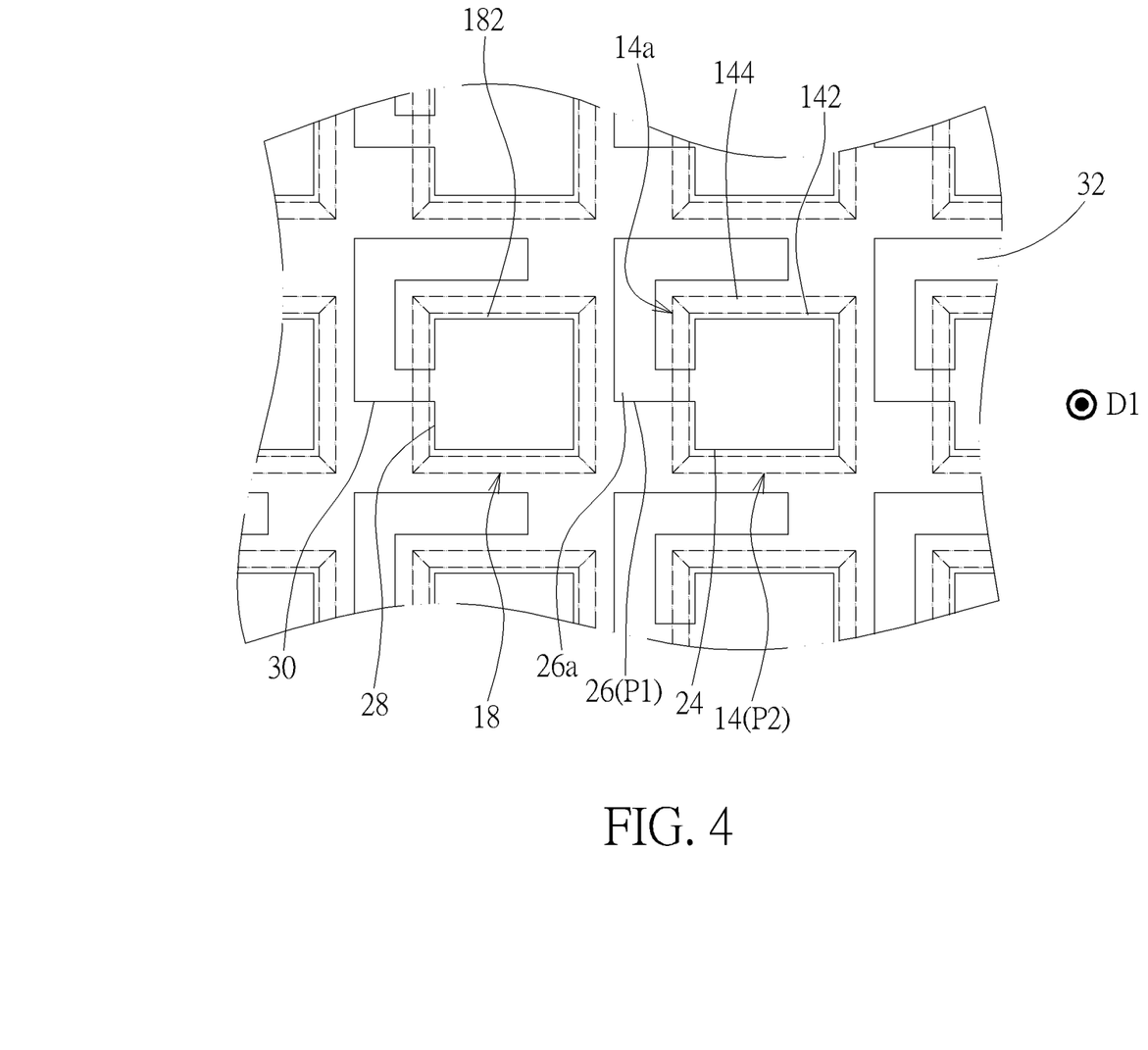
FIG. 4 is a schematic diagram illustrating a configuration of a first connection circuitry portion according to another embodiment.
Figure 5:
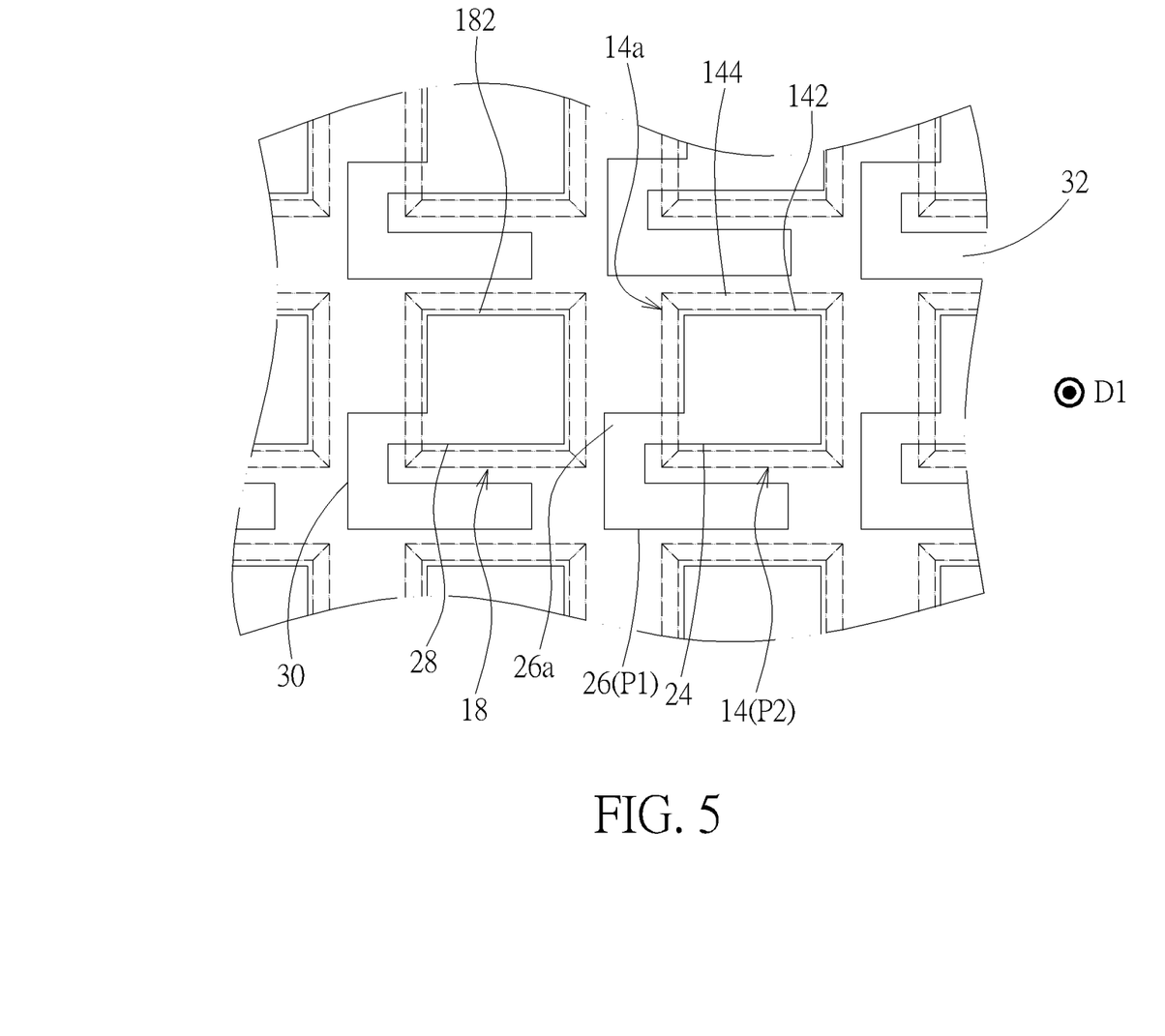
FIG. 5 is a schematic diagram illustrating a configuration of a first connection circuitry portion according to another embodiment.
Figure 6:
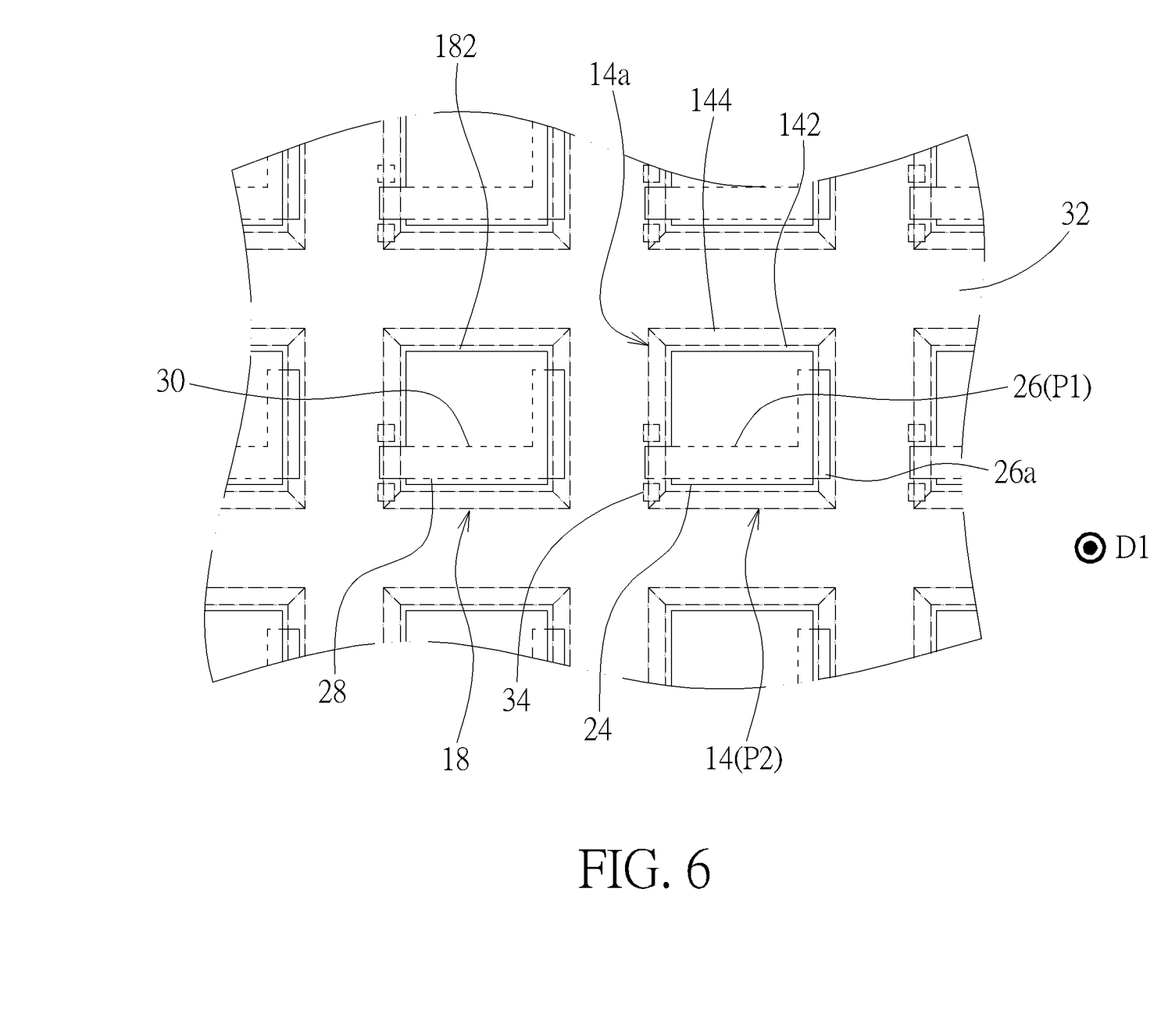
FIG. 6 is a schematic diagram illustrating a configuration of a first connection circuitry portion according to another embodiment.

As shown by FIG. 1, the first connection circuitry portion 26 is located between the first keycap 14 and the second keycap 18. The outer covering layer 32 completely covers the first connection circuitry portion 26. The projection P1 of the first connection circuitry portion 26 in the vertical direction D1 (equivalent to the profile of the first connection circuitry portion 26 in FIG. 1) is outside the projection P2 of the first keycap 14 in the vertical direction D1 (equivalent to the profile of the first keycap 14 in FIG. 1), and has a horizontal corner 26a (i.e. corresponding to one structural corner of first connection circuitry portion 26). The structural corner can increase the structural flexibility of the first connection circuitry portion 26. Furthermore, the projection P1 of the first connection circuitry portion 26 extends parallel to a periphery edge 14a of the first keycap 14, which can reduce the probability of structurally interfering with other structures. In practice, the first connection circuitry portion 26 includes more structural corners, as shown by FIG. 4 and FIG. 5. Furthermore, if the space between the keycap 14 and the base 12 permits, the first connection circuitry portion 26 connecting the first touch circuitry portion 24 and the circuit board 122 also can extend between the keycap 14 and the base 12 and include a structural corner, as shown by FIG. 6. Furthermore, in FIG. 6, when the projection P1 of the first connection circuitry portion 26 in the vertical direction D1 and the projection (P2) of the keycap skirt 144 in the vertical direction D1 cross or overlap, a spacing part 34 (shown by a block, of which the profile is shown in hidden lines in FIG. 6) can be disposed under the keycap skirt 144, so that when the first keycap 14 moves down, the keycap skirt 144 can be prevented from hitting the first connection circuitry portion 26 resulting in damage. In practice, the spacing part 34 can be directly disposed on both sides of the first connection circuitry portion 26, so as to increase the protection effect on the first connection circuitry portion 26. The spacing part 34 can be realized by a rigid block (e.g. but not limited to a protrusion protruding upward from the base plate 120, for blocking the first keycap 14 from moving down further) or a buffer part (e.g. but not limited to foam, rubber and so on, for reducing the impact of the first keycap 14, even to block the first keycap 14 from moving down further when the buffer part is compacted).

Figure 6A:
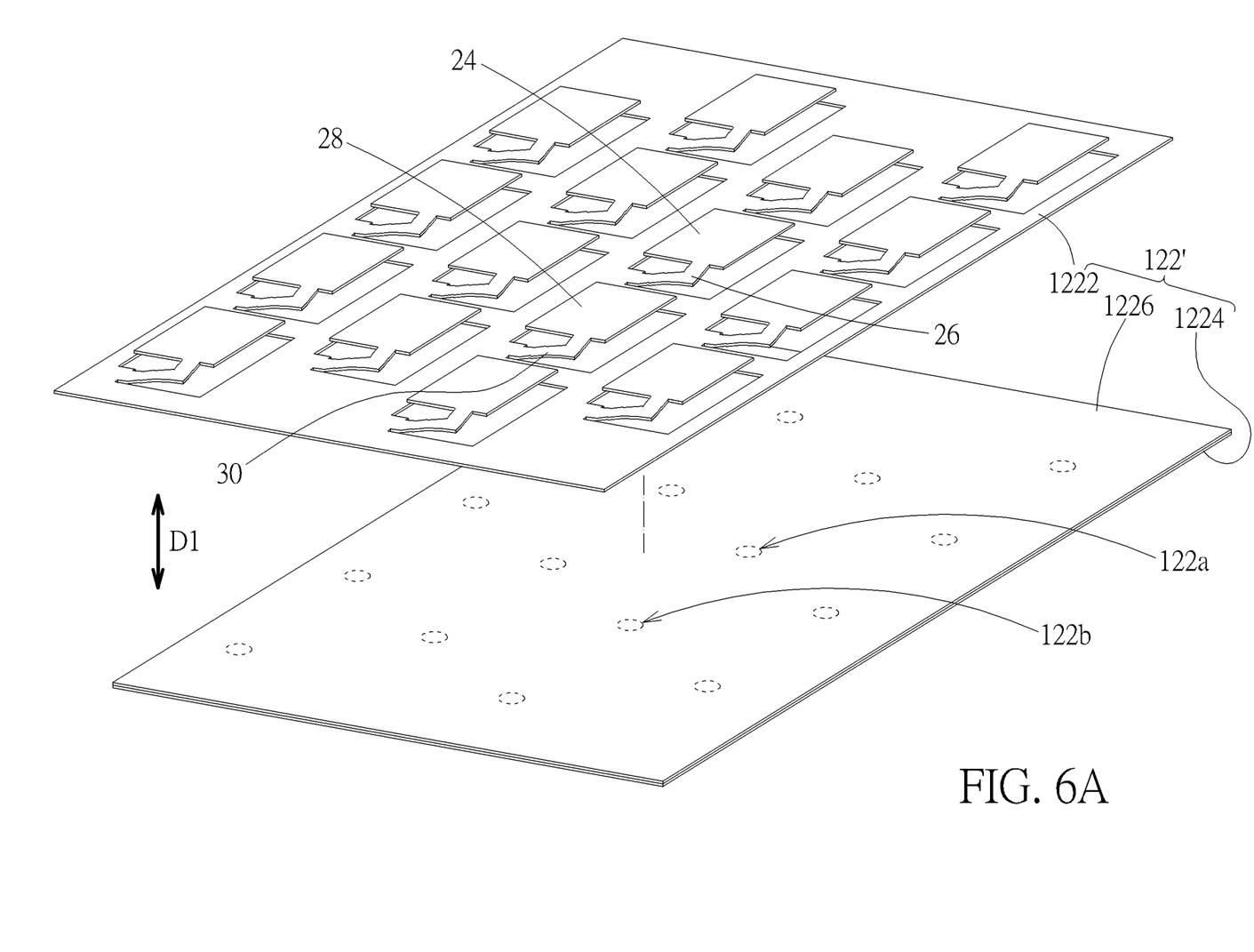
FIG. 6A is a schematic diagram illustrating a configuration in which the first connection circuitry portion is structurally integrated into the circuit board.

Furthermore, in practice, the first touch circuitry portion 24 and the first connection circuitry portion 26 can be realized by a single flexible circuit board, respectively. The flexible circuit board can be coated with glue, so as to adhere to the first keycap 14. Therein, the distal end of the first connection circuitry portion 26 is electrically connected to the circuit board 122 (e.g. but not limited to through connectors). Furthermore, the first touch circuitry portion 24 and the first connection circuitry portion 26 also can be structurally integrated into the circuit board 122. For example, referring to FIG. 1 to FIG. 3, a portion of one substrate S of the circuit board 122 is extended to form the first touch circuitry portion 24 and the first connection circuitry portion 26 (e.g. a portion of the substrate 1222, on which required circuitry is formed, bends upward to be fixed to the first keycap 14 so as to be the first touch circuitry portion 24 and the first connection circuitry portion 26; the isolation layer 1226 is sandwiched between the substrates 1222 and 1224, as shown by FIG. 6A). In addition, the above descriptions relative to the first connection circuitry portion 26 also apply to the second connection circuitry portion 30, which will not be described in addition.

Furthermore, in practice, the first touch circuitry portion 24 and the first connection circuitry portion 26 can be realized by a single flexible circuit board, respectively. The flexible circuit board can be coated with glue, so as to adhere to the first keycap 14. Therein, the distal end of the first connection circuitry portion 26 is electrically connected to the circuit board 122 (e.g. but not limited to through connectors). Furthermore, the first touch circuitry portion 24 and the first connection circuitry portion 26 also can be structurally integrated into the circuit board 122. For example, a portion of one substrate of the circuit board 122 is extended to form the first touch circuitry portion 24 and the first connection circuitry portion 26 (i.e. a portion of the substrate, on which required circuitry is formed, bends upward to be fixed to the first keycap 14 so as to be the first touch circuitry portion 24 and the first connection circuitry portion 26). In addition, the above descriptions relative to the first connection circuitry portion 26 also apply to the second connection circuitry portion 30, which will not be described in addition.

Figure 7:
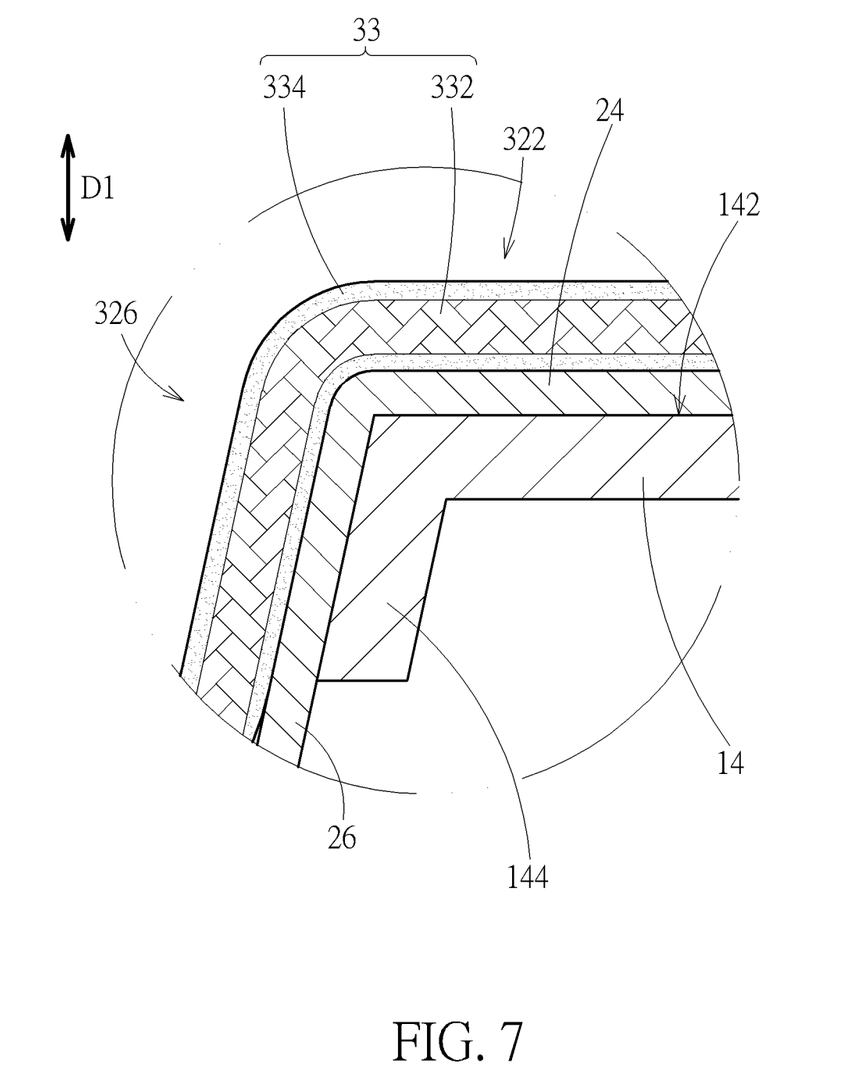
FIG. 7 is a sectional view of a portion of an outer covering layer according to another embodiment.

As shown by FIG. 1 and FIG. 2, the outer covering layer 32 is a multilayer structure and includes a light-penetrable substrate 328 and a light-blocking layer 330 formed on the light-penetrable substrate 328. In practice, the light-penetrable substrate 328 can be a polymer film. The light-blocking layer 330 is ink printed on the light-penetrable substrate 328. The light-blocking layer 330 can be coated with glue in advance, so that the outer covering layer 32 can easily adhere to the first keycap 14 and/or the first touch circuitry portion 24 (and the first connection circuitry portion 26). The light-blocking layer 330 covers the first touch circuitry portion 24, the first connection circuitry portion 26, the second touch circuitry portion 28, the second connection circuitry portion 30, and the gap between the first keycap 14 and the second keycap 18. In practice, if the keyboard 1 is equipped with backlight, the light-blocking layer 330 can form holes (or the holes having profiles of specific numbers, letters, characters, symbols and so on) at proper positions according to a backlight design. Furthermore, in practice, if there is no need for light transmission on the outer covering layer 32, the outer covering layer 32 can be opaque; for example, the light-blocking layer 330 can completely cover the light-penetrable substrate 328, or the outer covering layer 32 is realized by an opaque substrate. Furthermore, in another embodiment, as shown by FIG. 7, an outer covering layer 33 includes a fabric layer 332 and a glue layer 334 joined onto a surface of the fabric layer 332. Depending on the actual application, the outer covering layer 33 can replace the above outer covering layer 32 or the light-penetrable substrate 328 thereof, or can be added into the outer covering layer 32 (e.g. stacked on the light-penetrable substrate 328, which can increase the appearance texture of the keyboard 1).

Figure 8:
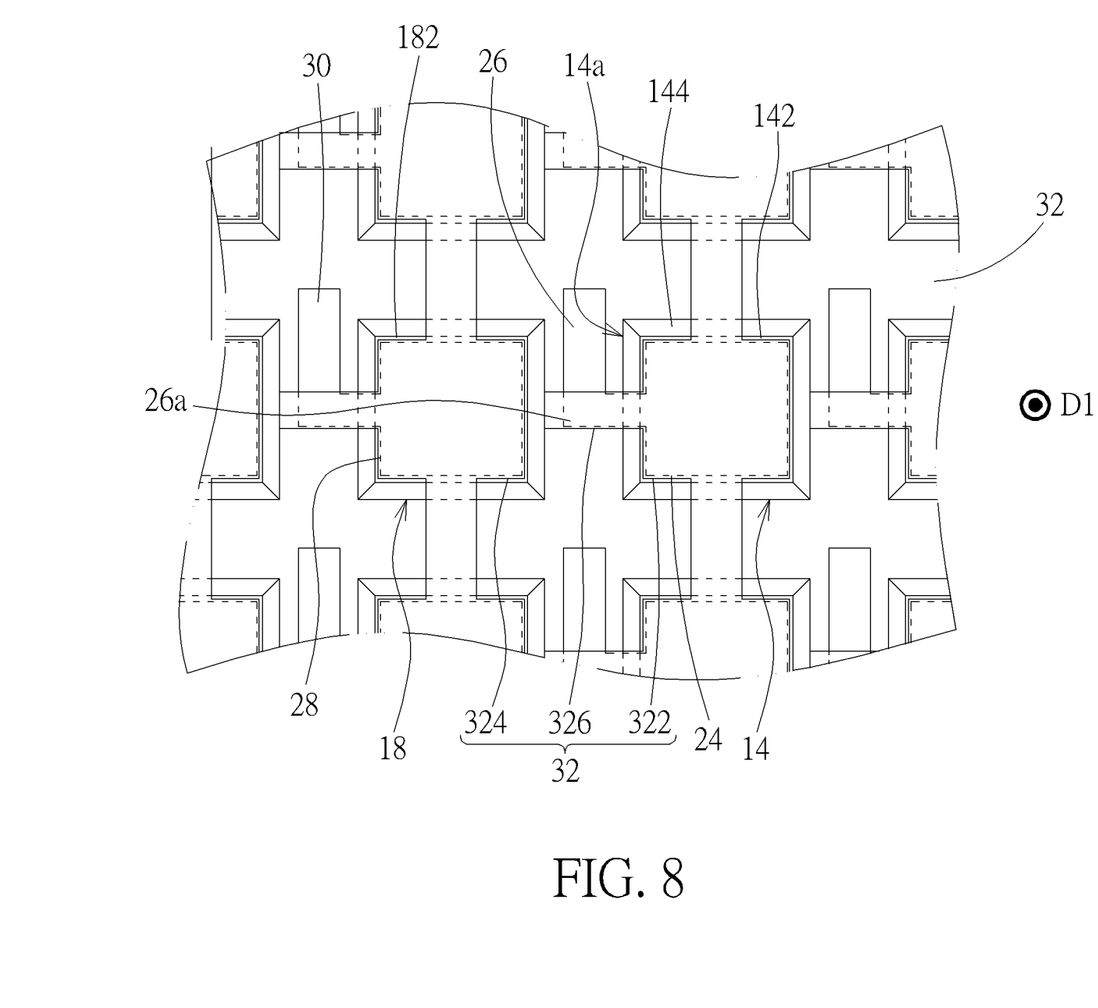
FIG. 8 is a top view of a portion of a keyboard according to another embodiment.

In addition, in the embodiment, the outer covering layer 32 completely covers the keyswitches of the keyboard 1. In practice, the outer covering layer 32 can mainly cover the circuitry portions (e.g. the first touch circuitry portion 24, the second touch circuitry portion 28, the first connection circuitry portion 26, and the second connection circuitry portion 30) that are easily touched by fingers of a user or external objects. For example, as shown by FIG. 8, the extension portion 326 of the outer covering layer 32 partially covers the keycap skirt 144 with the profile of the first touch circuitry portion 24, even partially covers the first horizontal keycap surface 142. This structural configuration can provide a good protection effect on the circuitry portions. Furthermore, as shown by FIG. 8, in general, it is not easy for fingers or external objects to touch the structure much lower than the keycap skirt 144, so the extension portion 326 also can partially covers the first connection circuitry portion 26 (especially covering the portion just extending from the first connection circuitry portion 26). This structural configuration can provide a certain degree of protection effect on the circuitry portions. The above descriptions of variations also apply to the second touch circuitry portion 28 and the second connection circuitry portion 30, which will not be described in addition.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A keyboard, comprising:
   a base, having a circuit board;
   a first keycap, disposed above the base, the first keycap having a first horizontal keycap surface and a keycap skirt, the keycap skirt bending and extending from the first horizontal keycap surface toward the base;
   a first lift mechanism, disposed between the base and the first keycap, the first keycap being up and down movable relative to the base through the first lift mechanism;
   a first touch circuitry portion, disposed on the first horizontal keycap surface;
   a connection circuitry portion, extending outward from the first touch circuitry portion and connecting the first touch circuitry portion and the circuit board, the connection circuitry portion extending downward and over a lower edge of an external surface of the keycap skirt;
   a second keycap, disposed above the base, the second keycap having a second horizontal keycap surface;
   a second lift mechanism, disposed between the base and the second keycap, the second keycap being up and down movable relative to the base through the second lift mechanism;
   a second touch circuitry portion, disposed on the second horizontal keycap surface; and
   an outer covering layer, covering the first touch circuitry portion, the second touch circuitry portion, and at least one portion of the connection circuitry portion simultaneously;
   wherein the circuit board has a substrate, and the substrate extends to form the first touch circuitry portion and the connection circuitry portion.

2. The keyboard according to claim 1, wherein the first keycap and the second keycap are separate, and the outer covering layer covers a gap between the first keycap and the second keycap.

3. The keyboard according to claim 2, wherein the outer covering layer has a first portion, a second portion, and an extension portion connecting the first portion and the second portion, the first portion covers the first touch circuitry portion, the second portion covers the second touch circuitry portion, the extension portion protrudes from the first horizontal keycap surface and the second horizontal keycap surface and covers the at least one portion of the connection circuitry portion and the gap between the first keycap and the second keycap, and the extension portion is flexible.

4. The keyboard according to claim 3, wherein the extension portion is a curved structure bending toward the base.

5. The keyboard according to claim 3, wherein the keycap skirt bends and extends from the first horizontal keycap surface slanting toward the base, the first touch circuitry portion is fixed to the keycap skirt, and the extension portion partially or completely covers the keycap skirt.

6. The keyboard according to claim 5, further comprising a spacing part, disposed right under the keycap skirt.

7. The keyboard according to claim 3, wherein the keycap skirt bends and extends from the first horizontal keycap surface slanting toward the base, the first touch circuitry portion is fixed onto the first horizontal keycap surface, the first portion is fixed to the first touch circuitry portion, and the extension portion partially or completely covers the keycap skirt.

8. The keyboard according to claim 7, wherein the first touch circuitry portion and the keycap skirt are separable, and the extension portion and the keycap skirt are separable.

9. The keyboard according to claim 8, wherein the extension portion is partially fixed to the connection circuitry portion.

10. The keyboard according to claim 2, wherein a vertical projection of the connection circuitry portion has a corner.

11. The keyboard according to claim 10, wherein the projection extends parallel to a periphery edge of the first keycap.

12. The keyboard according to claim 10, wherein the connection circuitry portion is located between the first keycap and the second keycap, and the outer covering layer completely covers the connection circuitry portion.

13. The keyboard according to claim 2, wherein the outer covering layer comprises a light-penetrable substrate and a light-blocking layer formed on the light-penetrable substrate, and the light-blocking layer covers the first touch circuitry portion, the second touch circuitry portion, the at least one portion of the connection circuitry portion, and the gap between the first keycap and the second keycap.

14. The keyboard according to claim 1, wherein the connection circuitry portion extends between the first keycap and the base.

15. The keyboard according to claim 1, wherein the outer covering layer is opaque.

16. The keyboard according to claim 1, wherein the outer covering layer comprises a polymer film and/or a fabric layer.

17. The keyboard according to claim 16, wherein the outer covering layer comprises a glue layer, joined onto a surface of the fabric layer.

18. A keyswitch, comprising:
   a base, having a circuit board;
   a keycap, disposed above the base, the keycap having a horizontal keycap surface and a keycap skirt, the keycap skirt bending and extending from the first horizontal keycap surface toward the base;
   a lift mechanism, disposed between the base and the keycap, the keycap being up and down movable relative to the base through the lift mechanism;
   a touch circuitry portion, disposed on the horizontal keycap surface;

a connection circuitry portion, extending outward from the touch circuitry portion and connecting the touch circuitry portion and the circuit board, the connection circuitry portion extending downward and over a lower edge of an external surface of the keycap skirt;

an outer covering layer, covering the touch circuitry portion and protruding from the keycap, the outer covering layer being flexible;

wherein the circuit board has a substrate, and the substrate extends to form the touch circuitry portion and the connection circuitry portion.

19. The keyswitch according to claim 18, wherein the outer covering layer comprises a first portion and an extension portion connected to the first portion, the first portion covers the touch circuitry portion, and the extension portion protrudes from the horizontal keycap surface and covers at least one portion of the connection circuitry portion.

20. The keyswitch according to claim 19, wherein the keycap skirt bends and extends from the horizontal keycap surface slanting toward the base, the touch circuitry portion is fixed onto the horizontal keycap surface, the first portion is fixed to the touch circuitry portion, and the extension portion partially or completely covers the keycap skirt.

21. The keyswitch according to claim 20, wherein the touch circuitry portion and the keycap skirt are separable, and the extension portion and the keycap skirt are separable.

22. The keyswitch according to claim 21, wherein the extension portion is partially fixed to the connection circuitry portion.

23. The keyswitch according to claim 19, wherein the keycap skirt bends and extends from the horizontal keycap surface slanting toward the base, the touch circuitry portion is fixed to the keycap skirt, and the extension portion partially or completely covers the keycap skirt.

24. The keyswitch according to claim 23, further comprising a spacing part, disposed right under the keycap skirt.

25. The keyswitch according to claim 18, wherein a vertical projection of the connection circuitry portion has a corner.

26. The keyswitch according to claim 25, wherein the projection extends parallel to a periphery edge of the keycap.

27. The keyswitch according to claim 25, wherein the outer covering layer completely covers the connection circuitry portion.

28. The keyswitch according to claim 18, wherein the outer covering layer comprises a light-penetrable substrate and a light-blocking layer formed on the light-penetrable substrate, and the light-blocking layer covers the touch circuitry portion.

29. The keyswitch according to claim 18, wherein the connection circuitry portion extends between the keycap and the base.

30. The keyswitch according to claim 18, wherein the outer covering layer is opaque.

31. The keyswitch according to claim 18, wherein the outer covering layer comprises a polymer film and/or a fabric layer.

32. The keyswitch according to claim 31, wherein the outer covering layer comprises a glue layer, joined onto a surface of the fabric layer.

* * * * *